(12) United States Patent
Creusen et al.

(10) Patent No.: US 9,713,232 B2
(45) Date of Patent: Jul. 18, 2017

(54) LIGHTING COMMISSIONING

(71) Applicant: PHILIPS LIGHTING HOLDING B.V., Eindhoven (NL)

(72) Inventors: Martinus Petrus Creusen, Wijlre (NL); Alexander James, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/916,304

(22) PCT Filed: Sep. 1, 2014

(86) PCT No.: PCT/EP2014/068523
§ 371 (c)(1),
(2) Date: Mar. 3, 2016

(87) PCT Pub. No.: WO2015/032721
PCT Pub. Date: Mar. 12, 2015

(65) Prior Publication Data
US 2016/0205749 A1    Jul. 14, 2016

(30) Foreign Application Priority Data
Sep. 3, 2013    (EP) .................................... 13182861

(51) Int. Cl.
*H05B 37/02* (2006.01)

(52) U.S. Cl.
CPC ..... *H05B 37/0272* (2013.01); *H05B 37/0218* (2013.01); *H05B 37/0254* (2013.01); *Y02B 20/46* (2013.01)

(58) Field of Classification Search
CPC . H05B 37/02; H05B 37/0218; H05B 37/0272
USPC .................................. 315/149–151, 155, 158
See application file for complete search history.

(56) References Cited

U.S. PATENT DOCUMENTS

| 5,448,359 A * | 9/1995 | Schick | G01B 11/026 250/559.29 |
|---|---|---|---|
| 6,846,116 B2 * | 1/2005 | Oka | G01D 5/26 250/227.11 |
| 8,159,156 B2 | 4/2012 | Henig et al. | |
| 2004/0002792 A1 | 1/2004 | Hoffknecht | |
| 2009/0146982 A1 | 6/2009 | Thielman et al. | |

(Continued)

FOREIGN PATENT DOCUMENTS

| JP | 2005331468 A | 12/2005 |
|---|---|---|
| JP | 2013527584 A | 6/2013 |

(Continued)

*Primary Examiner* — Jason M Crawford
(74) *Attorney, Agent, or Firm* — Meenakshy Chakravorty

(57) ABSTRACT

A method of determining a distance from a first luminaire (22) to a second luminaire (22) comprises causing a light source co-located with the second luminaire to emit light directed towards a reflecting surface (A). The method further comprises detecting a level of reflected light from the reflecting surface using a sensor co-located with the first luminaire (22), and accessing a reflectance value determined for the reflecting surface (A). The method further comprises modifying the level of reflected light to take into account the accessed reflectance value, and using the modified measure to provide a measure of a distance between the first and second luminaires.

13 Claims, 4 Drawing Sheets

(56) References Cited

U.S. PATENT DOCUMENTS

| | | | |
|---|---|---|---|
| 2010/0277080 A1 | 11/2010 | Waffenschmidt et al. | |
| 2011/0031897 A1* | 2/2011 | Henig | H05B 37/0254 315/297 |
| 2012/0001841 A1* | 1/2012 | Gokingco | G01J 1/32 345/102 |
| 2012/0161643 A1* | 6/2012 | Henig | H05B 37/0254 315/151 |
| 2012/0194083 A1* | 8/2012 | Henig | H05B 37/0254 315/152 |
| 2013/0154486 A1 | 6/2013 | Barrilleaux | |
| 2015/0145419 A1* | 5/2015 | Lashina | H05B 33/0872 315/153 |

FOREIGN PATENT DOCUMENTS

| | | |
|---|---|---|
| WO | 2008078253 A2 | 7/2008 |
| WO | 2010119482 A1 | 10/2010 |
| WO | 2013068861 A1 | 5/2013 |
| WO | 2013068866 A1 | 5/2013 |

* cited by examiner

LIGHTING COMMISSIONING

CROSS-REFERENCE TO PRIOR APPLICATIONS

This application is the U.S. National Phase application under 35 U.S.C. §371 of International Application No. PCT/EP2014/068523, filed on Sep. 1, 2014, which claims the benefit of European Patent Application No. 13182861.8, filed on Sep. 3, 2013. These applications are hereby incorporated by reference herein.

FIELD OF THE INVENTION

The present invention relates to lighting commissioning.

BACKGROUND OF THE INVENTION

The present disclosure relates to the field of lighting commissioning. With the inroad of digital intelligence in individual light sources, the field of commissioning of lighting control systems to manage such intelligent individual light sources is becoming an increasingly critical step for a successful installation. Proper commissioning is essential for proper equipment operation, user acceptance and reaching target energy savings. For example, Florida Power & Light defines commissioning as a "systematic process of ensuring that all building systems perform interactively according to the documented design intent and the owner's operational needs." Most energy codes now require lighting automation, and the 2005 California Title 24 energy code now requires control system commissioning as part of project certification. While the term "commissioning" might extend over a wide variety of contexts in the field of proper installation of lighting control systems, it is established that in a proper method of commissioning, it is important to derive relative distances between individual luminaires which constitute the lighting components in a lighting system to be installed. This allows the establishment of a fixture map with relative positions of the luminaires and standalone sensors and controls, which enables the luminaires to be assigned to different groups within the luminaire landscape and thus to be controlled as groups.

While in principle, there are enormous advantages to be gained by the new lighting systems incorporating intelligent luminaires, in fact traditional cost and required resources for installation and proper commissioning of such complex lighting systems may form a bottleneck for involved decision makers, and may inhibit the take-up of the opportunities to be offered by intelligent lighting systems. With a properly commissioned system however, embedded and automatic lighting control systems can reduce lighting consumption by 20% to 40% in existing buildings and new constructions, as compared with conventional lighting systems.

Thus, so-called auto commissioning techniques are being developed.

U.S. Pat. No. 8,159,156 describes a method of auto commissioning in which a fixture map is derived by determining the relative distances between the individual luminaires. The luminaires are equipped with light sensors which are therefore co-located with each luminaire. By sequential emission of light by the individual luminaires, the amount of light detected at the other luminaires can be converted into a relative distance measurement. As a result, a map with the relative positions of the luminaires can be created. Finally, the luminaires can be assigned to different groups defined with this luminaire landscape.

SUMMARY

The inventors have recognized some practical difficulties associated with the auto commissioning system described in U.S. Pat. No. 8,159,156. For typical office lighting installations, the luminaires which are used are recessed into or suspended from the ceiling (consider for example Philips' PowerBalance luminaire family). The amount of light detected by an embedded light sensor in the luminaire thus strongly depends on the reflection coefficient of the projected local area, directly under the luminaire. The inventors have recognized that the relative distance measurements established using the technique described in U.S. Pat. No. 8,159,156 based on the light levels from surrounding luminaires are likely to be flawed because light sensor measurements can fluctuate significantly due to non-uniformly distributed reflectivity in their surrounding area (e.g. open office space). For example, tables may have a higher reflective surface than the surrounding floor. The fixture map obtained in U.S. Pat. No. 8,159,156 uses a triangulation method based on mapping circles with the measured distances. Different reflectance can affect significantly the accuracy of distance measurement.

According to one aspect of the invention, there is provided a lighting commissioning system comprising:

a plurality of luminaires, each luminaire co-located with a light source and a light sensor;

a controller configured to selectively control the light sources to emit light and to receive signals from the light sensors representative of light sensed thereby; and a memory accessible to the controller; wherein the controller is configured to execute a first phase of commissioning to determine at least one reflectance value associated with a reflecting surface in a light path to each light sensor, and to store the reflectance values in the memory, and a second phase of commissioning in which the reflectance values are accessed by the controller for converting light sensed by each light sensor from an emitting light source into a measure of a distance between the emitting light source and the sensor.

Another aspect of the invention provides a method of determining a distance from a first luminaire to a second luminaire comprising: causing a light source co-located with the second luminaire to emit light directed towards a reflecting surface; detecting a level of reflected light from the reflecting surface using a sensor co-located with the first luminaire; accessing a reflectance value determined for the reflecting surface; modifying the level of reflected light to take into account the accessed reflectance value; and using the modified measure of emitted light to provide a measure of a distance between the first and second luminaires.

The reflectance value represents the reflection coefficient of the reflecting surface, and in some embodiments can be the reflection coefficient. In other embodiments, where a level of emitted light from the light sources is common across multiple measurements, the reflected light itself can provide a reflectance value suitable for modifying the level of reflected light.

The following described embodiments present an exemplifying technique with four steps of a commissioning process:

Step 1: Determine reflection coefficients of areas under and nearby individual luminaires Step 2: Measure sequentially different light levels by controlling different combinations of luminaires (light sources) and sensors Step 3: Determine relative distances between luminaires using the reflection coefficients of Step 1.

Step 4: Derive fixture map from relative distances between luminaires

For a better of understanding the present invention and to show how the same may be carried into effect, reference will now be made by way of example to the accompanying drawings.

DESCRIPTION OF THE EMBODIMENTS

In the embodiments discussed in the present disclosure, a method of determining a distance from a first luminaire to a second luminaire is described in which the conversion of the light level into a distance measurement takes into account a determined reflection coefficient. In one embodiment, the reflection coefficient is assessed by using a local light source in the luminaire above a local reflection area, and calibrating the reflection coefficient by using an embedded sensor in the same luminaire. Assuming the reflection of the local surface is of a Lambertian type, the assessed reflection coefficient can also be used to convert the measured light intensity related to the light emitted by other luminaires in the same office area.

As described in the following, a first phase in a method of commissioning a lighting system involves determining reflection coefficients and a second phase involves using the determined reflection coefficients in a method of determining distance between luminaires. The distance measures can be used to obtain a fixture map, for example using a triangulation method of plotting circles as described in U.S. Pat. No. 8,159,156.

Figure 1:
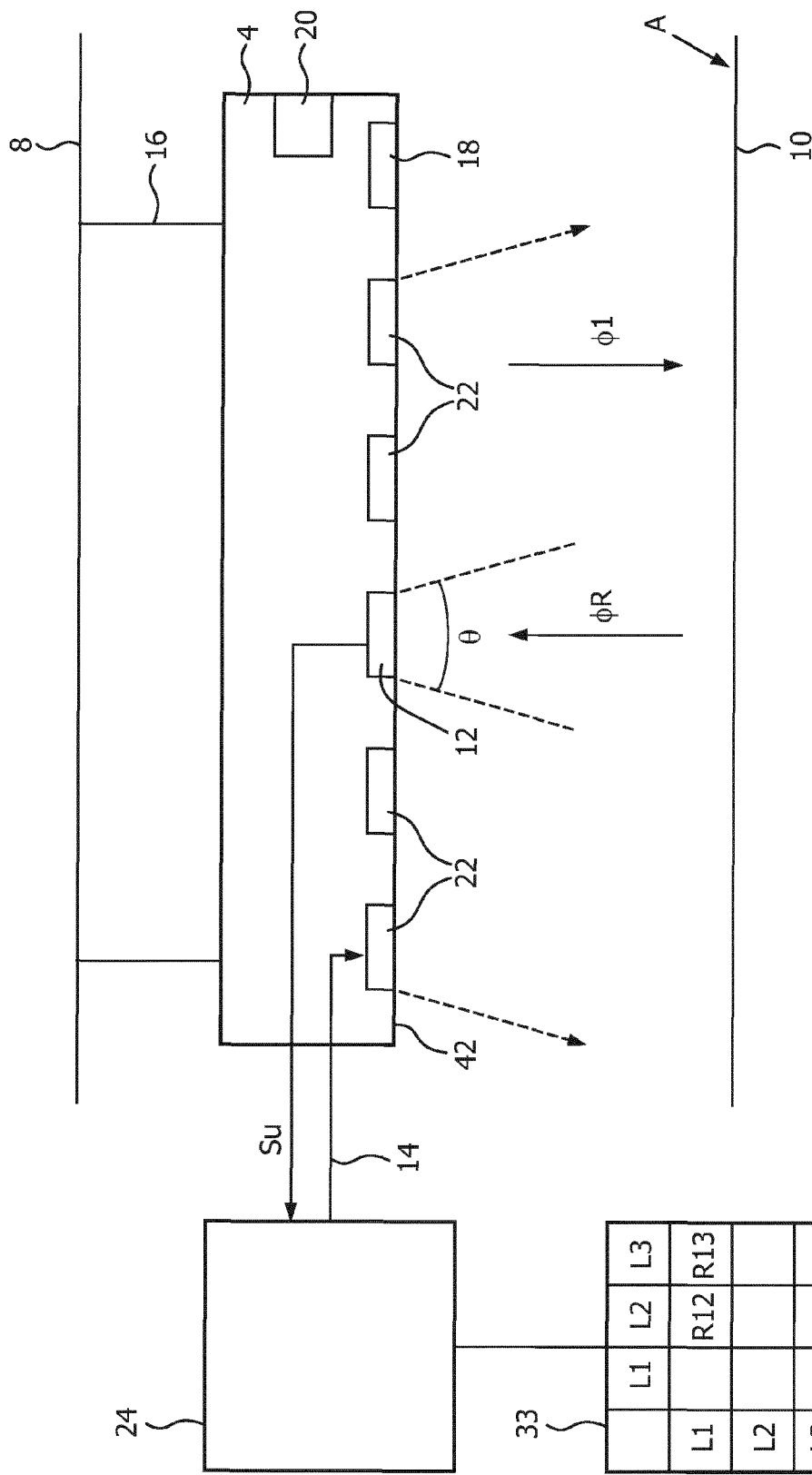
FIG. 1 is a schematic block diagram of a controlled luminaire.

FIG. 1 illustrates by way of an example, a luminaire 4 suspended by a suspension infrastructure 16 from a ceiling 8 of an area to be illuminated, such as an office. The techniques described herein are also applicable to recessed luminaires. The luminaire 4 has a direct lighting component which can comprise one or more direct lighting device 22 configured to direct illumination generally downwardly towards a workplane 10 and mounted on a lower surface 42. In addition, a sensor 12 is provided with a field of view facing outwards which is generally cone-shaped and is denoted by dotted lines. To complete the picture but in a diagrammatic form, a controller 24 is connected to control the luminaire. In this disclosure, the controller operates as a commissioning unit. The controller includes a processing unit, executing a computer program to process light signals and output control signals. The controller can be provided in the luminaire itself, or can be provided within the space connected to a plurality of similar luminaires and/or other lighting devices in the space. The controller 24 receives sensor signals $S_u$ from the sensor 12 based on light $\phi r$ detected by the sensor 12 within its field of view. The sensor signal $S_u$ has a level related to the light sensed by the sensor—when converted by the sensor it provides a light signal to the controller 24 representing the sensor input. The controller 24 may receive signals from more than one sensor in the space. In use of the lighting system, the controller 24 is responsible for adjusting the light output of the lighting components 22 during commissioning while using the detected sensor inputs from the sensor 12 (and possibly from other sensors in the space), for example, by controlling dimming levels, color, beam shape, etc. through control signal 14. In the commissioning stage, the controller 24 is operable to implement the first and second phases and to generate an output comprising a fixture map showing the estimated position of luminaires in the space.

Some luminaires are equipped for a so-called dual-beam concept, wherein a wide beam and/or a narrow beam can be selected by suitably controlling the lighting devices 22.

According to the commissioning method of the present disclosure, the reflection coefficient R1 of the local area under a luminaire, generally denoted A on the workplane 10, is determined in a first phase prior to determining relative distance measurements between luminaires in a second phase. Calibration of the local area reflection coefficient is done by measuring the light reflection $\phi r$ when powering the lighting component 22 embedded in the same luminaire. When powered, the lighting component 22 sends a flux $\phi 1$ down towards the workplane 10. This results in the reflected flux $\phi r$ incident on the sensor 12. When the luminaire is equipped with a so-called dual-beam concept, it is the narrow beam which is used to determine the local reflection coefficient (in order to reduce second order effects like reflections from walls or windows, etc.), as described more fully later.

The determined reflection coefficient is used during a commissioning process to modify the sensed values of light reflected from neighboring luminaires as will be described more fully later.

Figure 2:
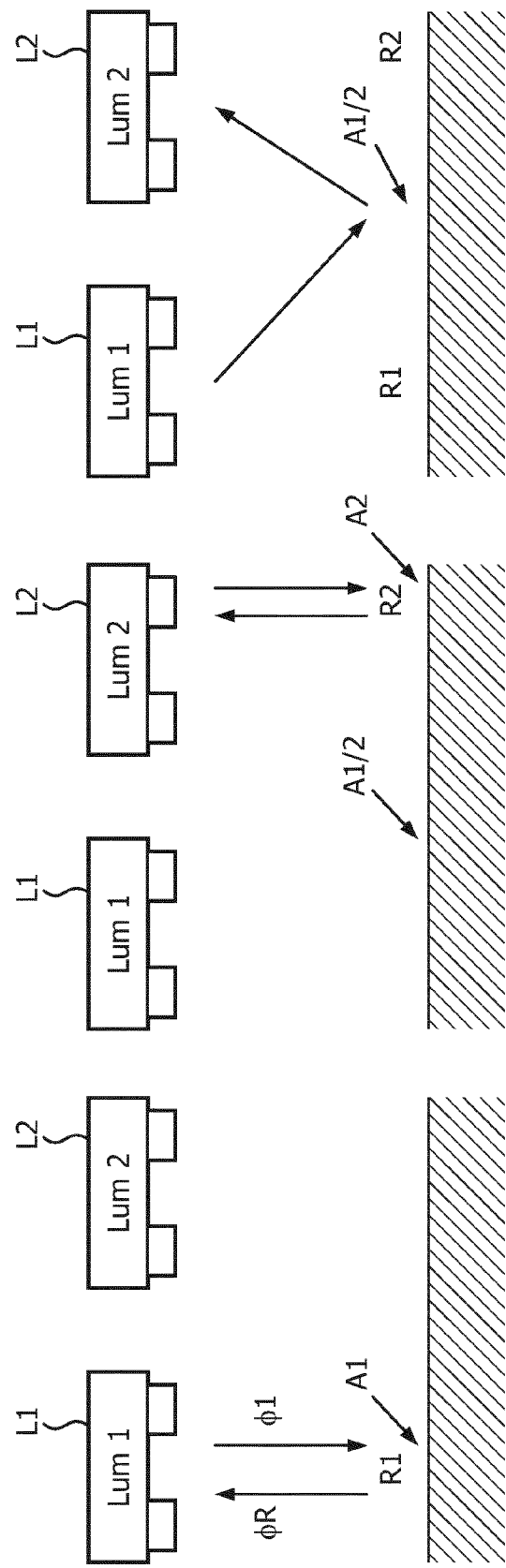
FIGS. 2A to 2C are schematic diagrams illustrating steps in calculation of a reflection coefficient.

The light sensor 12 can be implemented as a light diode/transistor. A CMOS/CCD camera can also be used the measure the amount of light with more spatial accuracy. Such sensors are known in available luminaires. FIGS. 2A, 2B and 2C show possible sequences for measuring reflection coefficients. FIG. 2A illustrates an area in which two luminaires L1, L2 are suspended from a ceiling. Although not shown in FIG. 2A, they are under the control of a controller such as controller 24 shown in FIG. 1. For example, the controller first activates a first luminaire L1 to cause it to direct a beam of light $\phi 1$ downwards to the area A1 immediately under the first luminaire. The sensor 12 detects the reflected flux $\phi r$ as a result of reflection coefficient R1 at the local area A1 which permits the reflection coefficient to be determined. For example, $$R1 = \frac{\varphi r}{\varphi 1},$$

where $\phi 1$ is known based on the output flux of the lighting device 22 for a given control power level on control signal 14, and $\phi r$ is converted into detector signal $S_U$.

Then, moving to FIG. 2B, the first luminaire L1 is depowered and the second luminaire L2 is powered to carry out the same sequence of steps from which the reflection coefficient R2 of the local area A2 under the second luminaire L2 can be determined.

Once R1 and R2 are known, they are applied to an algorithm to determine the reflectance value of an intermediate area A1/2 shared by the luminaires, for example $$R_{12} = \frac{R1 + R2}{2}.$$

FIG. 2C illustrates the first step in an alternative process for determining the reflection coefficient of an intermediate area A1/2 between local area A1 and local area A2. According to the first step, the first luminaire L1 has its beam powered on, and a measurement is taken from the sensor of the second luminaire L2. This is referred to as Ri1. Subsequently, the first luminaire L1 is powered off and the second luminaire L2 is powered on, to direct a beam of light downwardly which is picked up by the sensor of the first luminaire L1. A reflection measurement is duly determined as Ri2. (It is expected that Ri1~Ri2). The resulting reflection coefficient for the intermediate area A1/2 is then determined as $$\frac{Ri1 + Ri2}{2}.$$

In the process of FIG. 2C, only one measurement (L1 to S2; or L2 to S1) may be needed, where S2, S1 denote the sensors on L2, L1 respectively.

It will be appreciated that more than two luminaires can be utilized to determine the reflection coefficient of an intermediate area using an extrapolation of the technique described with respect to FIG. 2C.

Figure 3:
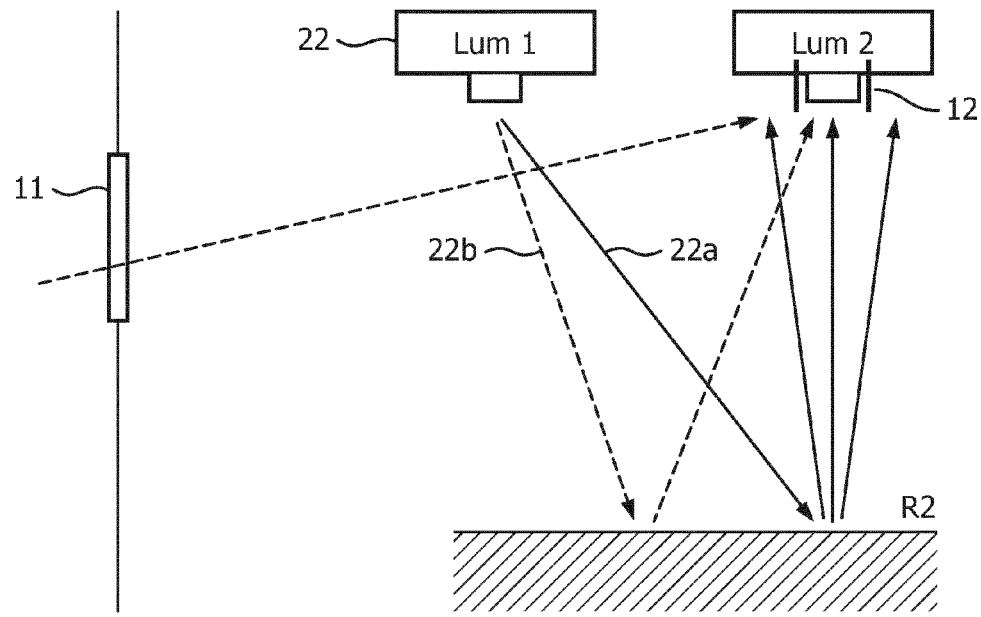
FIG. 3 is a schematic diagram illustrating sensor angle sensitivity.

The manner in which the reflectance of the intermediate area between two neighboring luminaires is calculated can depend on a number of factors. Sensors provided on luminaires can differ and in particular their directional sensitivity for the detection of light can vary between a relatively narrow angle of detection and a wider, more omnidirectional angle of detection. FIG. 3 illustrates two luminaires adjacent a window where a narrow angle of sensitivity can be used to receive only light (diffusely) reflected from the surface under the luminaire and filter specular reflected light from, e.g. windows shown at 11 in FIG. 3).

Figure 4:
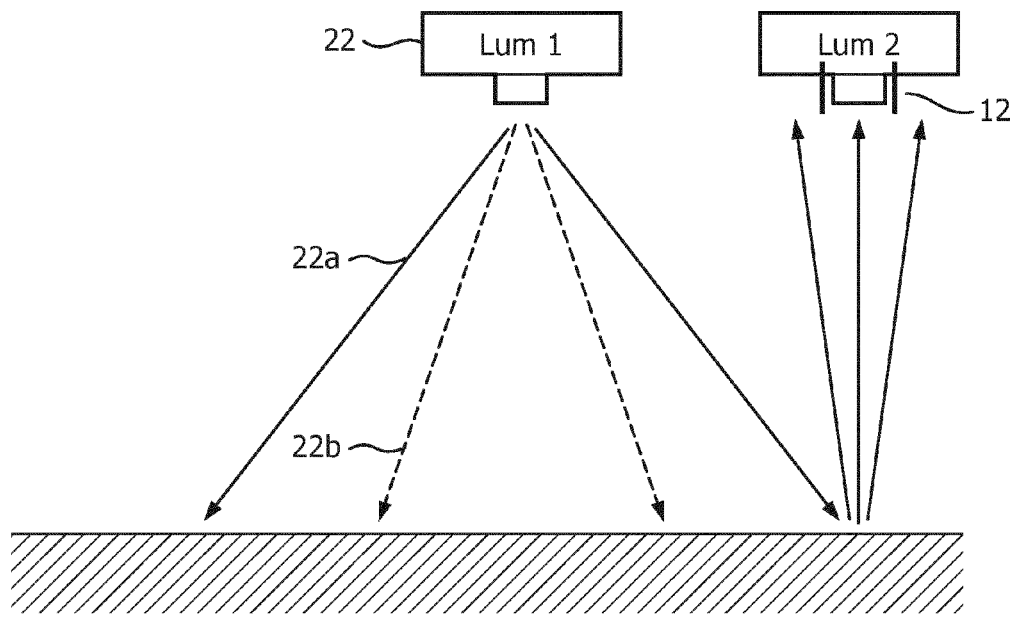
FIG. 4 is a schematic diagram illustrating dual beam illumination.

Moreover, as mentioned, some luminaires are equipped with a dual-beam concept which allows the angle of light emitted by the light source of the luminaire to be directed in a narrow angle or in a wider beam (see FIG. 4 where the full lines denote a wide beam 22a and the dotted lines a narrow beam 22b. When determining how to make the optimum measurement of the reflection coefficient of an intermediate area between two luminaires, the nature of the sensor and light source with which the luminaires are equipped can be taken into account to determine whether it is likely to be more accurate to take two measurements directly downwards of the luminaires as shown in FIGS. 2A and 2B, and then average these measurements, or whether it may be more appropriate to use a technique as described with reference to FIG. 2C. In the case of a luminaire with a dual-beam concept, powering only the narrow beam 22b will enable a more accurate assessment of the reflection coefficient of the local area under a luminaire. The approach of FIG. 2C would probably be more accurate where the sensors are more omnidirectional, and in this case if the luminaire is equipped with a dual-beamed concept the wider beam could be utilized to maximize the reflected light sensed by the omnidirectional sensor of the neighboring luminaire.

As illustrated in FIG. 3, the reflected light (emitted by a neighboring luminaire) may consist of both specular and diffuse contributions. The specular contribution can be determined by e.g. combining the wide beam light distribution of the neighboring luminaire with the wide angle sensor of the detecting luminaire. The diffuse contribution can be measured by using the wide beam emission and a narrow angle sensor in the detecting luminaire, as shown by the bold line wide beam 22a in FIG. 3.

Combinations of the two techniques are also anticipated to provide a number of possible measurements which can be utilized in an algorithm to determine the reflection coefficient of an intermediate area.

As a further improvement, the light sensor can be provided with a programmable narrow detection angle (for maximum 20 degrees) to ensure that only the reflection coefficient of the local area under the luminaire is determined, and thereby reducing the contributions of reflections of walls/windows. This angle is denoted θ in FIG. 1.

Once determined, the reflectance values are stored in suitable storage, such as a memory 30 associated with the controller 24. Each reflectance value is associated in connection with the luminaires which share the area for which the reflectance value has been determined. A simple matrix example is shown in FIG. 1, wherein for example, the reflectance value associated with the shared area between luminaire 1 and luminaire 2 is marked R12, in the appropriate matrix location. It will readily be appreciated this it is likely that there will be several luminaires in the vicinity and shared spaces associated with each luminaire, where a more complex matrix structure would be required to store the reflectance values.

Figure 5:
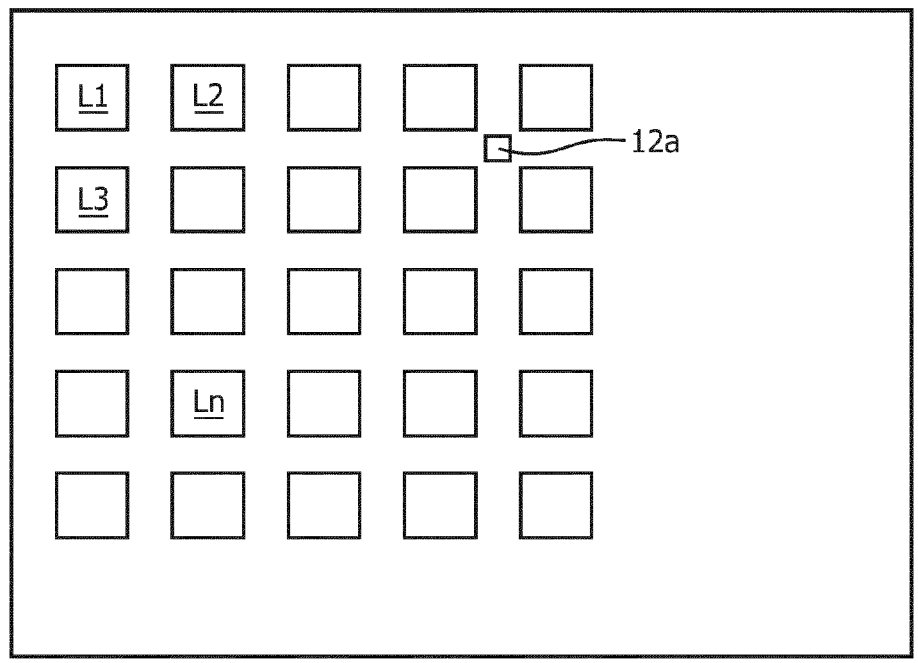
FIG. 5 is a schematic plan view from the underside showing an array of luminaires.

FIG. 5 shows an example plan view from the underside of a set of luminaires mounted on a ceiling. Luminaires L1, L2, L3 . . . Ln are shown in a grid formation, but any formation of luminaires is possible. Each luminaire has an associated reflectance value, related to the area it shares with a detecting sensor, as shown in the matrix 33 of FIG. 1. Once the reflectance values for shared areas have been determined and stored, they are used in the second phase of the commissioning method.

Figure 6:
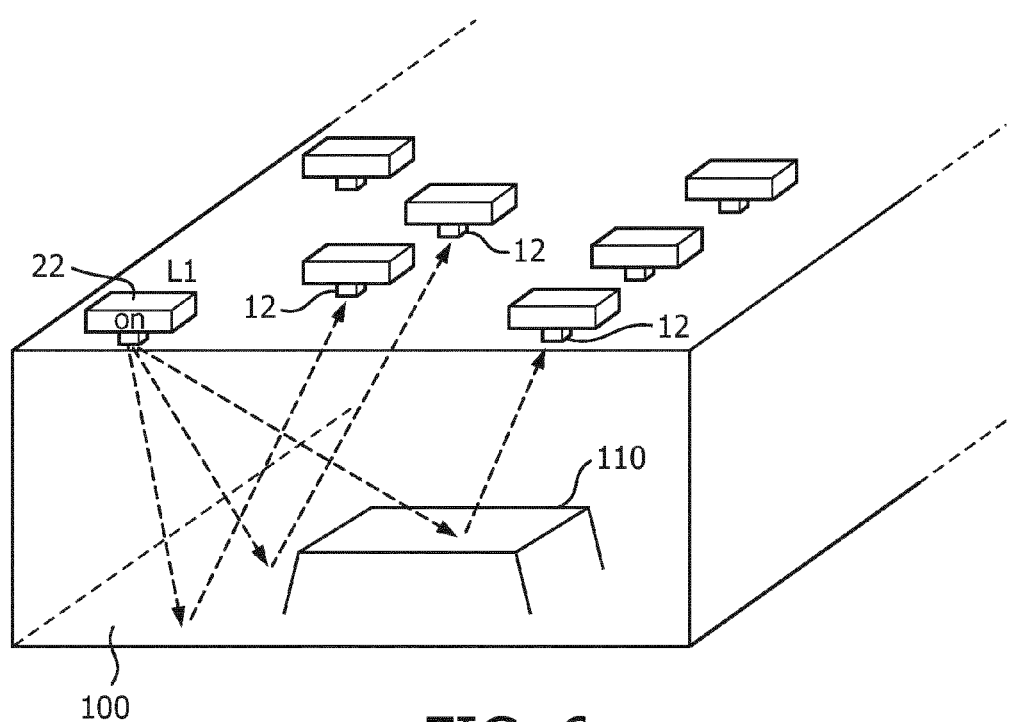
FIG. 6 is a perspective view of a space during commissioning.

FIG. 6 is a schematic perspective of a space in which commissioning is to be conducted. The floor 100 may have for example a dark carpet and the space may include light grey tables 110 with a higher reflectivity.

In the second phase, each luminaire is powered in turn to project light (Luminaire L1 is shown ON in FIG. 6). When one luminaire is powered, the sensors 12 associated with all other luminaires in the space are monitored and their signals $S_u$ are recorded. Then, the storage 30 is accessed to retrieve reflectance values associated with each combination of pair of luminaires or group of luminaires using the sensor number to identify a "recipient" luminaire. These reflectance values are used to modify the signals $S_u$ received from the relevant recipient luminaires to take into account the reflectance value in the light path from the emitting luminaire. The modified signal values can then be used to determine the relative distance from each recipient luminaire from the emitting luminaire in a manner which is known per se. The most straightforward implementation is the correction of Su (measured by luminaire Ln) with the local reflectance value Rn, without taking into account the intermediate calculated reflectance values, however intermediate reflectance values can also be taken into account for a more accurate result.

The formula to calculate "interluminaire" distance is given below:

$$Int_2 = Amb + C \cdot R_2 \cdot (Flux_1/(D_{1-2})^2)$$

where flux 1 is the luminous flux emitted by Lum 1

$R_2$ is the reflectance under Lum2

$Int_2$ is the light intensity measured by sensor embedded in Lum2 ($Int_2$)

$D_{1-2}$ is the distance between Lum1 and Lum2

Amb is the ambient light contribution (by dimming the emitting luminaire, the factor Amb can be determined); and C is constant (e.g. depending on sensor sensitivity)

It will be appreciated that the technique used in phase 2 of commissioning is similar to that shown in FIG. 2C, but in phase 2, this is not done for the purpose of determining the reflectance value, but instead, the reflectance value which was determined in phase 1 is utilized to modify the sensor output signal $S_u$ so that a more accurate assessment of the distance of the emitting luminaire (L1 in FIG. 2C) from the recipient luminaire (L2 in FIG. 2C) can be determined. In this way, a more accurate fixture map indicating the relative positions of the luminaires can be achieved.

A further enhancement is tuneable color. The reflectance under a luminaire is measured as a function of color ((x,y) or CCT). This can improve signal to noise (S/N) ratio of interluminaire distance measurement.

While sensors have been described as co-located with luminaires, it will be apparent that they would be stand alone or associated with any fixture or fitting, such as controls like light switches or dimmers.

Other variations to the disclosed embodiments can be understood and effected by those skilled in the art in practice in the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are cited in mutually different dependent claims does not indicate that a combination of these measures cannot be used to advantage. The computer program may be stored/distributed on a suitable medium, such as an optical storage medium or a solid state medium supplied together with or as part of other hardware, but may also be distributed in other forms, such as via the Internet or other wired or wireless telecommunication systems. Any reference signs in the claims should not be construed as limiting the scope.

The invention claimed is:

1. A lighting commissioning system comprising:
   a plurality of luminaires, each luminaire co-located with a light source and a light sensor;
   a controller configured to selectively control the light sources to emit light and to receive signals from the light sensors representative of light sensed thereby; and
   a memory accessible to the controller;
   wherein the controller is configured to execute a first phase of commissioning to determine at least one reflectance value associated with a reflecting surface in a light path to each light sensor, and to store the reflectance values in the memory, and a second phase of commissioning in which the reflectance values are accessed by the controller for converting light sensed by each light sensor from an emitting light source into a measure of distance between the emitting light source and each light sensor;
   wherein the controller is configured in the first phase of commissioning to carry out the steps of:
   activating a light source of a first luminaire;
   measuring light reflected from a local area to a light sensor on the first luminaire;
   determining a reflection coefficient for the local area; and
   repeating the steps for at least one neighboring luminaire to thereby determine at least one additional coefficient for a local area under the neighboring luminaire; and
   executing an algorithm to calculate the at least one reflectance value associated with the reflecting surface which lies between the local area of the first luminaire and the local area of the at least one neighboring luminaire.

2. A system according to claim 1, wherein the algorithm generates an average of the reflection coefficients.

3. A system according to claim 1, wherein the light source of at least some of the plurality of luminaires is controllable into a first mode with a narrow beam and a second mode with a broader beam.

4. A system according to claim 1, wherein the light sensor for each luminaire is selected from a directional light sensor and an omnidirectional light sensor.

5. A system according to claim 4, wherein the sensor angle of the directional sensor is programmable.

6. A system according to claim 1, wherein the memory holds a matrix of reflectance values, each reflectance value associated with an intermediate area between neighboring luminaires identified in the matrix.

7. A system according to claim 1, wherein the controller is configured to operate in the second phase of commissioning to determine a fixture map of light sources and sensors using the determined distances.

8. A commissioning system according to claim 1, comprising at least one fixture light sensor under the control of the controller, whereby a position of the at least one fixture sensor can be determined in the second phase of commissioning based on light sensed at the least one fixture sensor.

9. A commissioning system according to claim 8, wherein the fixture sensor is stand alone or is co-located with a fixture comprising a light control such as a light switch or dimmer.

10. A commissioning system according to claim 1, wherein the light source of at least some of the luminaries is controllable to emit light of different color, whereby reflectance values for different colored light can be determined.

11. A method of determining a distance from a first luminaire to a second luminaire comprising:
    causing a light source co-located with the second luminaire to emit light directed towards a reflecting surface;
    detecting a level of reflected light from the reflecting surface using a sensor co-located with the first luminaire;
    accessing a reflectance value determined for the reflecting surface;
    modifying the detected level of reflected light to take into account the accessed reflectance value; and
    using the modified measure to provide a measure of a distance between the first and second luminaires.

12. A method according to claim 11, when used in commissioning a lighting system to determine a fixture map of luminaires based on the distance measurements.

13. A method according to claim 11, which comprises the step of determining the reflectance values in a first phase of commissioning.

* * * * *